United States Patent
Gao et al.

(10) Patent No.: US 10,579,357 B2
(45) Date of Patent: Mar. 3, 2020

(54) COGNITIVE EXPECTED PROGRAM CODE INSTALLATION RESULT ASSESSMENT

(71) Applicant: INTERNATIONAL BUSINESS MACHINES CORPORATION, Armonk, NY (US)

(72) Inventors: Shan Gao, Beijing (CN); Xue F. Gao, Beijing (CN); Peng Han, Beijing (CN); Zhen Y. Shi, Beijing (CN); Qing F. Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 15/655,238

(22) Filed: Jul. 20, 2017

(65) Prior Publication Data
US 2019/0026091 A1  Jan. 24, 2019

(51) Int. Cl.
  *G06F 8/61* (2018.01)
  *G06F 11/30* (2006.01)
  *G06N 5/04* (2006.01)

(52) U.S. Cl.
  CPC .............. *G06F 8/61* (2013.01); *G06F 11/301* (2013.01); *G06N 5/04* (2013.01)

(58) Field of Classification Search
  CPC .......... G06F 8/61; G06F 8/71; G06F 9/45533; G06F 11/301; G06N 5/04
  (Continued)

(56) References Cited

U.S. PATENT DOCUMENTS 8,972,963 B2  3/2015  Baset et al.
9,405,530 B2  8/2016  Islam et al.
(Continued)

FOREIGN PATENT DOCUMENTS

EP    3016016 A1 *  5/2016  .............. G06F 8/61
WO   2012054160 A2    4/2012

OTHER PUBLICATIONS

Cosmo et al, "Automated Synthesis and Deployment of Cloud Applications", [Online], 2014, pp. 211-221, [Retrieved from internet on Oct. 2, 2019], <http://delivery.acm.org/10.1145/2650000/2642980/p211-dicosmo.pdf> (Year: 2014).*
(Continued)

*Primary Examiner* — S. Sough
*Assistant Examiner* — Zengpu Wei
(74) *Attorney, Agent, or Firm* — Michael O'Keefe; Matthew M. Hulihan; Heslin Rothenberg Farley & Mesiti PC

(57) ABSTRACT

Cognitive expected program code installation result assessment by a method that includes collecting environment information about a cloud computing environment and collecting description information about program code for potential installation. The method maintains a hierarchical model for determining whether the program code is expected to install properly on the computer system, and uses the hierarchical model for such determining, including performing an analysis that proceeds through level(s) of the model based on the description information and arrives at an indication as to whether the program code is expected to install properly. The method performs processing based on determining whether the program code is expected to install properly, for instance by generating and providing a recommendation to a user regarding installation of the program code.

16 Claims, 8 Drawing Sheets

(58) Field of Classification Search
USPC .......................................................... 717/174
See application file for complete search history.

(56) References Cited

U.S. PATENT DOCUMENTS

| | | |
|---|---|---|
| 9,442,715 B2 | 9/2016 | Zhang et al. |
| 10,127,034 B1* | 11/2018 | Troyanovsky ........... G06F 8/658 |
| 2004/0210653 A1 | 10/2004 | Kanoor et al. |
| 2005/0049906 A1* | 3/2005 | Leymann ............... G06Q 10/10 717/174 |
| 2010/0145945 A1* | 6/2010 | Episale .................. G06Q 10/10 707/736 |
| 2011/0225461 A1* | 9/2011 | Wookey .................. G06F 8/658 714/38.1 |
| 2013/0232497 A1* | 9/2013 | Jalagam ................ G06F 9/5072 718/104 |
| 2013/0332900 A1* | 12/2013 | Berg ......................... G06F 8/71 717/121 |
| 2015/0178063 A1 | 6/2015 | Narkinsky et al. |
| 2015/0378714 A1* | 12/2015 | Katariya ................... G06F 8/65 717/170 |
| 2016/0004528 A1 | 1/2016 | Price et al. |
| 2018/0302303 A1* | 10/2018 | Skovron ............. G06F 11/0709 |

OTHER PUBLICATIONS

Frey et al, "Search-Based Genetic Optimization for Deployment and Reconfiguration of Software in the Cloud", [Online], 2013, pp. 512-521, [Retrieved form internet on Oct. 2, 2019], <http://eprints.uni-kiel.de/19237/1/ICSE2013-FreyFittkauHasselbring-Preprint.pdf> (Year: 2013).*

Huang, Hai, et al., "Patch Management Automation for Enterprise Cloud", IBM, retrieved on Mar. 6, 2017 from Internet URL: <https://pdfs.semanticscholar.org/4b29/21b8352b27e67ffdaf11f0c0b09248a3333e.pdf>, 15 pgs.

"Scalable Cloud Delivery and Patch Management of Cloud Computing Assets", IBM, retrieved on Jan. 5, 2017 from Internet URL: <http://www-03.ibm.com/software/products/en/ibmsmarpatcmana>, 3 pgs.

Mell, Peter, et al., "The NIST Definition of Cloud Computing", NIST Special Publication 800-145, Sep. 2011, Gaithersburg, MD, 7 pgs.

* cited by examiner

COGNITIVE EXPECTED PROGRAM CODE INSTALLATION RESULT ASSESSMENT

BACKGROUND

As cloud environments become increasingly popular, cloud security is an important focus. Automated processes for software installation, for instance operating system and application-level security patches, can be critical to cloud business. Traditionally, a cloud provider maintains a security patch repository of pre-evaluated patches for guest operating systems and applications. However, the increasing popularity of open-source applications and tools, user-installed applications, and diverse configurations pose a challenge to cloud security, specifically the desire to maintain potentially thousands of application patches in a smart and secure way. Some heterogeneous patches may be successfully applied, while others may not, which directly impacts the security & safety of other parts of the surrounding cloud environment.

SUMMARY

Shortcomings of the prior art are overcome and additional advantages are provided through the provision of a computer-implemented method. The method collects environment information about a cloud computing environment, the environment information including identifiers of software installed on computer systems of the cloud computing environment. The method also collects description information about program code for potential installation on a computer system of the cloud computing environment. The method maintains a hierarchical model for determining whether the program code is expected to install properly on the computer system, the hierarchical model including a hierarchy of multiple levels of program characteristics. The method uses the hierarchical model in determining whether the program code is expected to install properly. The determining includes performing an analysis that proceeds through one or more levels of the multiple levels of the hierarchical model based on the description information about the program code and arrives at an indication in the hierarchical model as to whether the program code is expected to install properly. The method also performs processing based on determining whether the program code is expected to install properly, the performing processing including generating and providing a recommendation to a user regarding installation of the program code.

Further, a computer program product including a computer readable storage medium readable by a processor and storing instructions for execution by the processor is provided for performing a method. The method collects environment information about a cloud computing environment, the environment information including identifiers of software installed on computer systems of the cloud computing environment. The method also collects description information about program code for potential installation on a computer system of the cloud computing environment. The method maintains a hierarchical model for determining whether the program code is expected to install properly on the computer system, the hierarchical model including a hierarchy of multiple levels of program characteristics. The method uses the hierarchical model in determining whether the program code is expected to install properly. The determining includes performing an analysis that proceeds through one or more levels of the multiple levels of the hierarchical model based on the description information about the program code and arrives at an indication in the hierarchical model as to whether the program code is expected to install properly. The method also performs processing based on determining whether the program code is expected to install properly, the performing processing including generating and providing a recommendation to a user regarding installation of the program code.

Yet further, a computer system is provided that includes a memory and a processor in communication with the memory, wherein the computer system is configured to perform a method. The method collects environment information about a cloud computing environment, the environment information including identifiers of software installed on computer systems of the cloud computing environment. The method also collects description information about program code for potential installation on a computer system of the cloud computing environment. The method maintains a hierarchical model for determining whether the program code is expected to install properly on the computer system, the hierarchical model including a hierarchy of multiple levels of program characteristics. The method uses the hierarchical model in determining whether the program code is expected to install properly. The determining includes performing an analysis that proceeds through one or more levels of the multiple levels of the hierarchical model based on the description information about the program code and arrives at an indication in the hierarchical model as to whether the program code is expected to install properly. The method also performs processing based on determining whether the program code is expected to install properly, the performing processing including generating and providing a recommendation to a user regarding installation of the program code.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
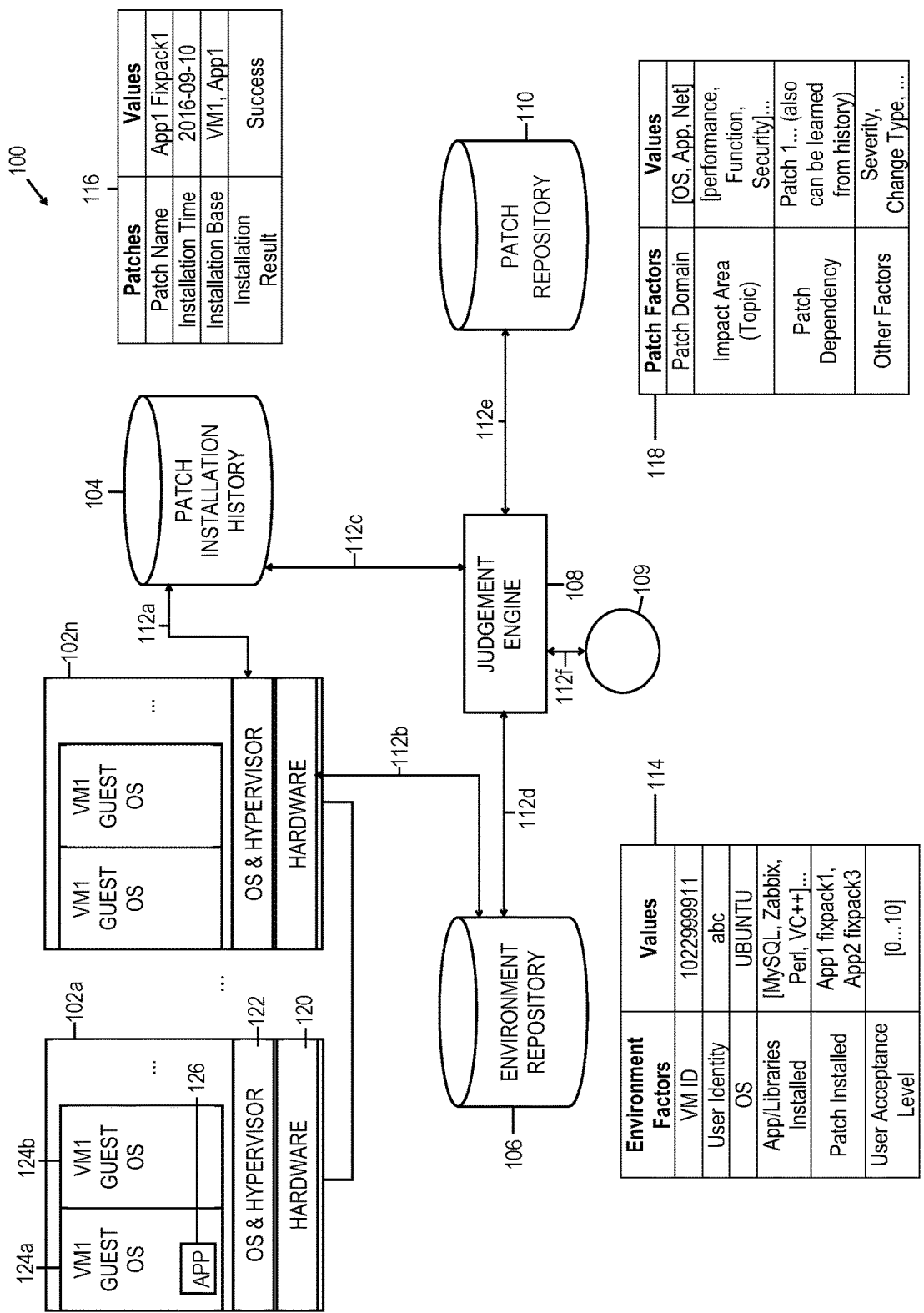
FIG. 1 depicts an example cloud computing environment to incorporate and use aspects described herein.

User-installed applications and other software installed on cloud computing nodes may be outside of the scope of management of a cloud service provider. Described herein are aspects for determining and applying criteria to automatically assess whether to recommend that program code (software, programs, instructions, modules, etc.), which in some examples are patches to already-install programs, should be applied/installed to computers, virtual machines (VMs), applications, etc. of a cloud computing environment, and how likely it is that such program code will be successfully applied, considering the environment, dependencies of the program code, and other factors. Additionally disclosed are approaches for constructively refining a model for such determinations, and increasing the success rates of program code installation.

Examples presented herein describe the specific situation of a software patch (referred to interchangeably herein as "update") proposed to be applied or installed, though aspects described are generally applicable to any type of program code, not just patches or updates. For example, aspects can assess the prospect of installation of full programs or any other kind of program code.

Thus, some aspects assess whether to apply a patch to a cloud guest operating system and/or application. The assessment can leverage cognitive analysis of pertinent factors for the patches, as well as patch-related environment elements and user behavior that may be pertinent to the installation of the particular patch to be installed. An example cognitive system backend for performing cognitive analysis is the IBM Watson line of offerings from International Business Machines Corporation, Armonk, N.Y., U.S.A.

Environment information or elements refer to factors related to patches to be installed, the factors having a potential impact on whether an attempt to install one or more potential patches will be successful. For example, information indicating the operating system, the application, and/or the existing patches that are installed may be relevant. Patch installation timing is another potential contributing factor. User behavior is yet another, for example through monitoring and history it may be ascertained whether/how likely an operating system owner or user is to accept, successfully install, and/or experience user-caused errors with a patch issued by a cloud administrator, thereby rendering the patch an unsuccessful installation. If the user has a history of, perhaps incorrectly, claiming supplied patches are incompatible with the user's current operating system or application, aspects described herein can give the user a low user acceptance value for patch installation success. By way of example, if in 10 different patch installation recommendation scenarios, the user accepts only 2 of the 10 patches, the user may be deemed 'negative' with a user acceptance score of 2 out of 10. This can be taken into account in the ongoing patch installation assessment described herein.

All or some collected environment information can be analyzed, with other information described herein, to generate a 'patch installation recommendation' result. indicating whether the patch is expected to install properly. This can be a recommendation that is provided to a user or administrator trying to determine whether to deploy a patch to a target.

Accordingly, described herein are aspects to determine patch applicability through patch installation history learning, together with security patch factors (domain, impact areas, dependencies), and cloud environment factors (operating system, application, libraries, middleware, installation timing, user behavior, etc.). A process can generate a recommendation for an administrator or other user as to whether a particular patch or other program code is expected to install properly, based on the foregoing factors. The process can be used to determine where (e.g. which cloud nodes, and their applications) the patches should be deployed based on the likelihood of successful installation. This can leverage a judgement model utilizing a hierarchical model, such as a tree data structure. Further approaches for refining, e.g. splitting and adjusting, the hierarchical model based on, e.g. user feedback, are also provided. For instance, a process is provided for feeding-back a reason for installation failure and splitting the model. With continuous result feedback, the judgement model can be made more accurate and workable.

FIG. 1 depicts an example cloud computing environment to incorporate and use aspects described herein. Environment 100 includes cloud computing node(s) 102a, . . . , 102n in communication with a patch installation history facility 104 and environment repository 106 across communication links 112a and 112b, respectively. Patch installation history facility 104 and environment repository 106 are each in communication with judgement engine 108 across communication links 112c and 112d, which is in communication with a patch repository 110 across communication link 112e. Patch installation history facility 104, environment repository 106, judgement engine 108, and patch repository 110 are each implemented by one or more computer systems(s), which may be the same or different computer systems—that is a given computer system can implement any one, multiple, or all of the foregoing. In some examples, the environment 100 is part of a cloud computing facility, or is distributed across multiple cloud computing facilities.

Communication links shown as arrows extending between components of FIG. 1 may occur over any appropriate wireless or wired communication link(s) for communicating data, which communication link(s) can encompass one or more local area network(s) and/or wide area network(s). Thus, in some embodiments, components form and/or communicate via one or more intervening networks over wired and/or wireless communication links.

The judgement engine 108 in some aspects assesses the likelihood of installation success of a proposed patch based on a joint analysis between environment information from the environment repository 106 and description information/patch factors about the proposed patch from the patch repository 110, using a hierarchical model 109 (in this example a model tree) with which judgement engine 108 communicates via communication link 112f.

Computing node 102a includes in this example hardware 120 on which software 122 (e.g. an operating system and hypervisor) execute. The software hosts virtual machines 124a, 124b in which applications (such as application 126) run.

Environment information 114 is extracted from cloud compute resources, e.g. computing nodes and/or controller nodes (not pictured), as both cloud controller services nodes and computing nodes may be candidates for continuous or periodic patching to enforce stability, security, and resilience. The environment information 114 can be collected by cloud monitoring, cloud log information extraction, and/or any other desired techniques that are encompassed by what is termed the environment repository 106 in FIG. 1. Usually the monitoring and log analysis modules will run on any arbitrary machines or systems capable of communicating with the nodes and/or a manager/controller thereof. Monitoring & log analysis modules can fetch data from a cloud management platform, hypervisor, or individual operating system/application agent, as examples.

The environment information 114 includes in this example identifiers of software (e.g. VM, operating system, application/libraries, patches, etc.) installed on the nodes, as well as identifier(s) of users of the nodes and user acceptance level(s). A user acceptance level is a score, after user acceptance testing, about how well a given user accepts a given patch. Per historic monitoring (described below), if a user takes 8 patches of 10 patches issued, then the user's acceptance level may be 8. Different users can each have a respective user acceptance level. The environment information is pulled into and stored in the environment repository 106.

The patch repository 110 pulls in and stores description information (also referred to herein as patch information or "patch data") about program code (e.g. patches) for potential installation on computer system(s) 124 of the cloud computing environment. Basic patch information can be pulled from websites, official guides, through a web spider/crawler, information tracking/extracting tools, etc. For some patch information, for example patch dependency information indicating dependencies of a patch, this may come from historic patch installation experiences, e.g. by way of the patch installation history facility 104 as explained in further detail herein. For instance, a message broker application may need a particular programming language module (e.g. python) to be installed or a pre-requisite runtime library, both of which are example dependencies. In the event that such dependency information is not ascertainable from the web spider/crawler or other information processing tools, this information can be fed from to the judgment engine 108 as history learning information from facility 104.

The description information 118 includes in this example a patch domain, referring to the type of software the patch is or is to be installed to, an impact area or topic of the software, referring in this example to a performance, function, or security area of impact of the patch, a list of patch dependencies, and other relevant factors, such as severity and/or change type of the patch. Additional or alternative description information about the patches may be relevant and therefore maintained in the patch repository if desired.

The judgment engine uses a built hierarchical model, for instance a model tree 109, in order to determine/assess whether a patch is expected to install correctly. For instance, the judgement engine produces a recommendation to an administrator or other user. In some examples, this could automatically authoritatively initiate installation of a patch, though in other examples the judgement engine's determination has no such effect and instead is merely informational and provided for another entity or user to use in initiating or refraining from (blocking) installing the patch.

Patch installation history facility 104 obtains and maintains patch installation history information 116, including indications of patch name, installation time, installation base, and installation result. Such information may be obtained from feedback, for instance that provided from the users and/or computing nodes 102, and used by the judgement engine in potentially updating the hierarchical model 109 as described herein.

The model tree 109, patch installation history facility 104, environment repository 106, and patch repository 110 do not necessarily reside on a common machine or on separate machines; they could be deployed on any one or more different machines or nodes according to scale and workload requirements as desired.

Figure 2:
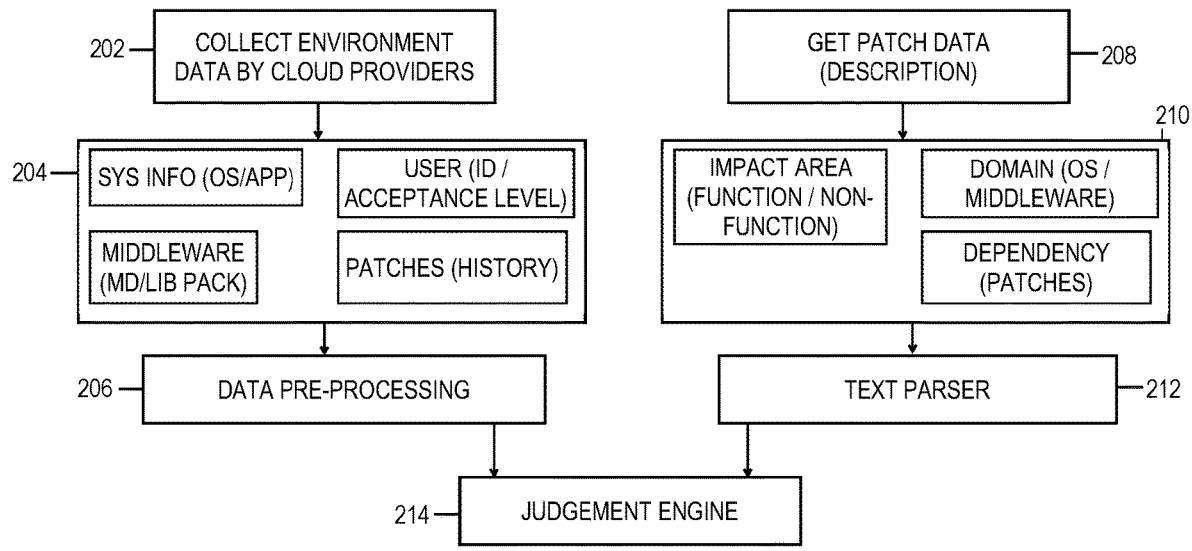
FIG. 2 depicts example data collection and processing in accordance with aspects described herein.

FIG. 2 depicts example data collection and processing in accordance with aspects described herein. A first aspect collects environment data by cloud provider(s) (202) to put into the environment repository 106. A computer system of the environment repository, the environment repository referring to both data processing and a repository/database, can perform these functions. As noted, the environment information (204 in FIG. 2) can include system information about operating system(s) and application(s), middleware/library information such as library packages, user information including user identifier and acceptance level, and patch information, particularly any historical information concerning installed patches or those attempted to be installed. The process then engages in data pre-processing (206), which may be a normalization of some/all environment information.

A second aspect of FIG. 2 collects patch data (208), for instance from public patch web sites and patch guides as examples. The information is stored in the patch repository after it is obtained. A computer system of the patch repository (110), the patch repository referring to both data processing and a repository/database, can perform these functions. As noted, the patch information (210 in FIG. 2) can include system information about impact area (topic), such as functional/non-functional aspects, a domain to which the patch applies, for instance operating system or middleware, and dependences. The process utilizes a text parser (212) installed/adapted in the patch repository, which can perform web crawling, information parsing, and general patch data capture functions to capture the description information.

The environment repository collects cloud environment information, including, as examples, but not limited to: identifiers of VMs, OSs, applications, middleware, and libraries installed on computing node(s), user identifiers, and user acceptance level(s). The environment repository may then normalize some or all of the environment information if desired.

The patch repository can collect and read patch description information (onsite or offsite) of a patch for possible installation. It may directly pull patch description information from a public patch website, for instance. In other examples, patch data (code, manuals, guides, release information, etc.) is collected and automatically scanned to glean description information from the installation guide information. The parsed results include the description information, which can include, but is not limited to: domain (software type), impact area(s) of the software, and patch dependency. Such information may be available from patch release guides and/or online public websites. By way of example, the domain of a patch may be Operating System (meaning the patch is a patch of the installed operating system), the impact may be a list of application(s) that will be impacted if the OS patch is installed (for instance because the applications are not compatible with that patch level), and a list of pre-requisite patches or other dependencies that are needed to be installed in order for the patch installation to be successful.

The environment repository and patch repository feed the collected environment information and patch description information into the judgement engine (214), in some examples doing so continuously or periodically as new information is collected. The judgement engine leverages a hierarchical model in determining whether the patch is expected to install properly on a given target system (computer system, node, virtual machine, etc.).

In examples presented herein, the hierarchical model is a tree data structure. In one example, the tree is built by the judgement engine. Leaf nodes of the tree represent whether a patch is expected to install successfully. Layers/levels of the tree are based on four categories of characteristics or factors: patch domain, impact area (or "topic"), environment factor, and patch dependency. The first layer/level in the tree is patch domain as illustrated and explained below. The root node of the tree may have more than two child nodes for this domain level, while the rest of the tree data structure may be a binary tree, meaning nodes have at most have two child nodes. In some examples, it is possible to know and pre-define the patch domains in which the patches fit, this number of domains can normally be fixed, and so there are a finite number of child nodes of the root node for this first (domain) level. Nodes in other levels can represent different characteristics, such as system environment, patch dependency, and so on. The diversity of division may not be pre-defined or discernable like the domain level, so it may be desired to use a binary tree to split the rest of the nodes and form the tree data structure more gradually. In addition, to avoid data sparsity, using a binary tree could improve the result.

Figure 3:
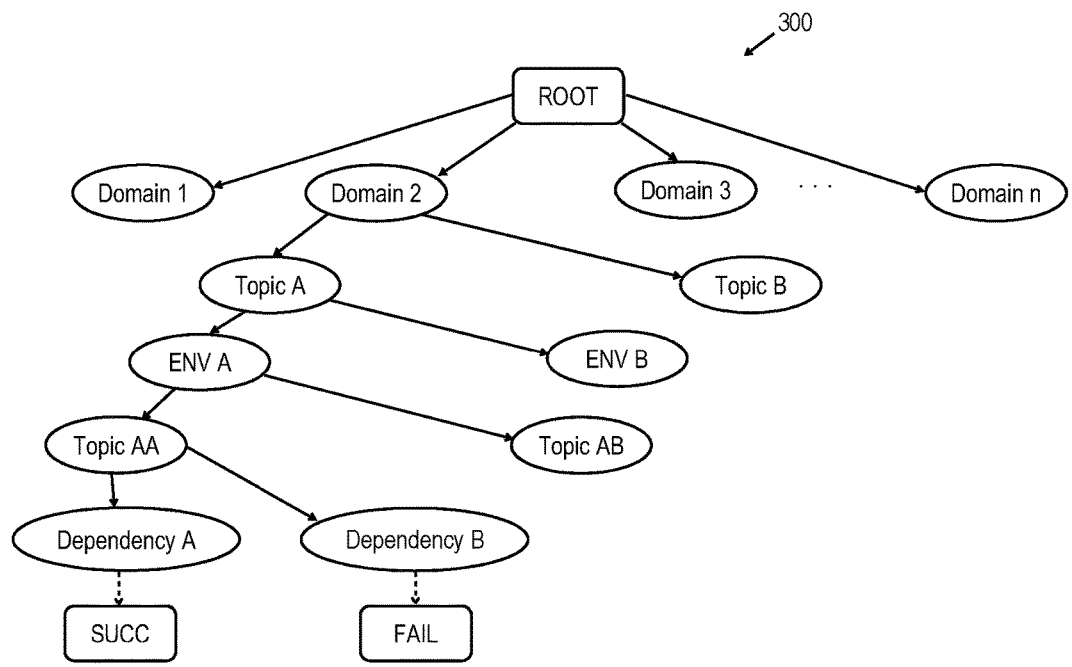
FIG. 3 depicts an example partial hierarchical model for use by a judgement engine in determining whether program code is expected to install properly, in accordance with aspects described herein.

FIG. 3 depicts an example partial hierarchical model for use by a judgement engine, in accordance with aspects described herein. Hierarchical model 300 is a tree in this example with a root node having n number of immediate child nodes for n number of Domains at a first level (the Domain level). In the illustration, child node Domain 2 is itself the root of a binary tree with several levels underneath. A first sub-level is a Topic level split between Topic A and Topic B. Under Topic A are paths for Environment A (ENVA) and Environment B (ENVB). Within Environment A (i.e. under ENVA node) are Topics AA and AB. Topic AA is split between cases where Dependency A is installed and Dependency B is installed. The leaf node under Dependency A indicates installation success (SUCC), while the leaf node under Dependency B indicates installation failure (FAIL). This illustration is only partial in that it shows just two complete paths (root to leaf) through the tree structure 300, extending through Domain 2, Topic A, Environment A, Topic A, Dependencies A and B; portions of the tree structure, for instance other paths, have been omitted from this depiction.

The path extending from root to SUCC indicates that a patch that correlates to that path is expected to install successfully, e.g. if the install scenario for the patch is Domain 2, Topic A, Environment A, Topic AA with dependency A installed. The path extending to FAIL indicates that a patch that correlates to that path is not expected to install successfully, e.g. if the install scenario is Domain 2, Topic A, Environment A, Topic AA with dependency B installed.

By way of specific example, Domain 2 may be Operating System, Topic A may be 'Security-type', ENVA may be Operating System Version 1.0 (with ENVB being NOT Operating System Version 1.0), Topic AA may be 'Performance-type' patch for OS V.1, and Dependency A may be 'Patch XYZ'.

To create a model, for instance the model shown in FIG. 3, after collecting patch information, a process parses the patch description using a text parser installed in the patch repository module. In the model tree, domain nodes may be pre-defined, so some patches can be easily classified into the domain nodes matched with their patch description if those patches have already provided specific domain information in their description. However, some patches do not have the specified domain information in their description. The patch description may be compared by using natural language processing with typical patches that fall into each domain. The domain node to which the patch correlates may be inferred from that comparison. Thus, according to the patch domain gleaned from the description, the process can pre-select a domain and some patches as representatives of the domain through analyzing their description. By determining the similarity between other patches and the representatives of model nodes, a given can be assigned/correlated to an appropriate domain.

For each domain, if all (or some threshold number, quantity, or percentage, for instance 2%) of its patches are able to be installed successfully, this domain as a whole can be considered a "success", meaning any patch that fits within that domain is expected to install properly on that domain. Conversely, if all (or some threshold number, quantity, or percentage, for instance 2%) of its patches are not be able to be installed successfully, the domain as a whole can be considered a "failure", meaning any patch that fits within that domain is expected to not install properly on that domain.

In many situations, installation success or failure requires a more granular assessment, as generally it is not true that all patches for a given operating system, application, or virtual machine fail or succeed. Thus, the model may typically include additional levels for topics, environments, dependencies, etc., as is depicted in FIG. 3.

Figure 4:
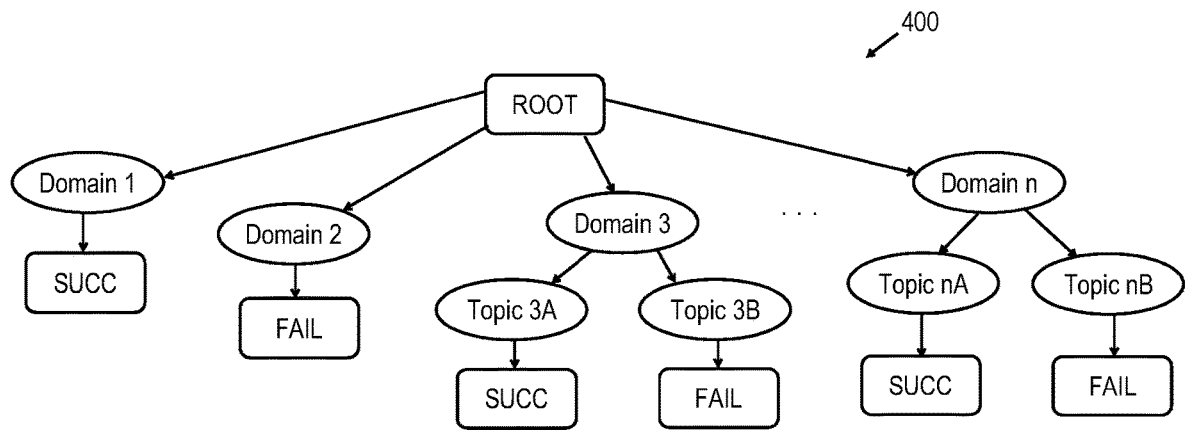
FIG. 4 depicts another example hierarchical model for determining whether program code is expected to install properly, in accordance with aspects described herein.

FIG. 4 depicts another example hierarchical model 400 for determining whether program code is expected to install properly, in accordance with aspects described herein. Here, patches in domain 1 are expected to install successfully, patches in domain 2 are expected to fail installation, and installation success for patches in domains 3 and n depend on the particular topic into which the patch falls.

If a given node simultaneously contains both "success" and "failure" patches (e.g. Domain 3 or Domain n), a calculation may be made as to the similarity in patch descriptions for an assessment of the similarity of the patches. Define a "success" patch description similarity (i.e. a score of the similarity of a group of patches that all succeeded installation in a given scenario) as SD, "failure" patch description similarity (i.e. a score of the similarity of a group of patches that all did not succeed in installation in the given scenario) as FD, and an all patches similarity (i.e. a score of the similarity of the two groups of patches together) as AD. SD, FD, and AD refer to a similarity score. By using existing natural language processing (NLP) technology, for example, key words of patch information may be compared to ascertain similarity scores between patches.

In one embodiment, if (SD+FD)/AD is above a threshold value, then the node (e.g. Domain 3 in FIG. 4) is split into two children topic nodes. However, if (SD+FD)/AD is below the threshold value, a calculation of similarity of environments of each patch record may be made: environment similarity of "success" patches (SE), environment similarity of "failure" patches (FE), and environment similarity of all patches (AE). If (SE+FE)/AE is above a threshold value, then the Domain node may be split into two children environment nodes. This is an alternative to splitting a domain node into topics, instead splitting into environments.

If both (SD+FD)/AD and (SE+FE)/AE are below their respective threshold values, then in some examples the patches are correlated to one of two nodes based on the patch installation result ("success" or "failure"), which creates an additional layer of children topic nodes and environment nodes. By way of example, the domain nodes in the first layer may be manually pre-defined, each of which can contain some children categories. For example, "Network" may be used as a domain and it may contain category topics such as "Performance", "Configure", and so on. These children topics may each be split into sub-level branches, for instance environment nodes.

It is possible that "failure" is caused when installation success of a patch depends on other patches. A layer for "patch dependency" can be used for handling dependency relationships. A dependency relationship can be identified based on patch description, environment information, and/or error/log messages from those attempts that have failed to install correctly. Patch installation success may therefore be based on whether all of its dependency patches are, or can be, successfully applied if they are not already installed.

Figure 5:
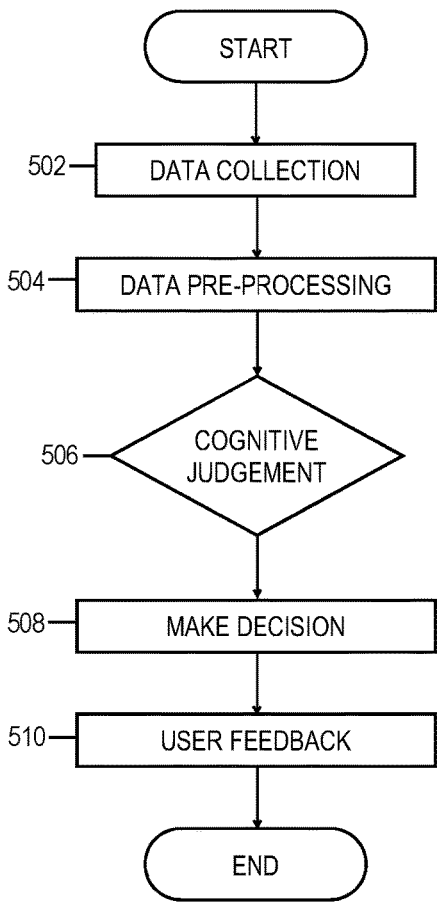
FIG. 5 depicts an example of a process for cognitive judgement in automatically determining whether to a patch on a computer system, in accordance with aspects described herein.

FIG. 5 depicts an example of a process for cognitive judgement in automatically determining whether to a patch on a computer system, in accordance with aspects described herein. In some examples, the process is performed by the judgement engine. In this scenario, the process judges whether a patch is expected to be applied successfully, if attempted. This is after and based on building at least an initial model tree. Initially, the process collects environment information and patch description information about the proposed patch (502), and then pre-processes and parses the description (504). Based on the model tree, the process uses cognitive judgement to follow the search path from root to a leaf node given the environment and description information (506), and possible correlation/similarity information to representative patches of the nodes along the way, eventually obtaining a result (508) (success or failure, indicating whether the patch is expected to install successfully or unsuccessfully). In some examples, there is a confidence score associated with each branch at each level, which score indicates the system's confidence that the patch correctly associates with that branch. A final confidence score is available when arriving the leaf node. Different paths, through the tree, for a given patch are possible. The path with the maximum confidence score can be chosen as the result (508).

The process also collects user feedback, application logs, and/or other system information (510) and verifies whether the decision (indication whether the patch is expected to succeed or fail installation) was correct. If the judgement was correct (for instance install was recommended and it succeeded), the nodes in the search path of the model tree from the first-layer/level (domain) to the leaf node can be updated for this patch, to update relevant parameters on these nodes. In other words, if the path/branch indicated the correct result, all of the nodes in the search path of the tree can record pertinent information about this patch, to associate/correlate the patch with that path of nodes through the hierarchy. This information can be utilized when assessing other patches, i.e. in potentially correlating proposed patches to that path to provide the indicated installation recommendation. Thus, the information added to a node based on feedback of the installation result for patches can be used in drawing similarity determinations between a proposed patch and those previous patches that have been associated as fitting with that node. By associating patch and description information of patches at nodes along a path to which those patches correlate, it provides greater accuracy in correlating other patches to the model tree paths, to provide a more confident prediction of whether the proposed patch will install correctly.

If judgement was incorrect, there are two possibilities: 1) it was recommended to install (i.e. the decision was that it was expected to install successfully), but the user or admin nevertheless fails to install the patch or the patch install failed; or 2) it was recommended not to install (i.e. the decision was that it was not expected to install successfully), but user(s) went ahead with the installation attempt anyway and it succeeded. In either case, the process can check the next (i.e. first) suboptimal (i.e. next highest confidence) path in the tree to determine whether it indicates what turned out to be the correct judgement. If this first suboptimal path does not indicate the correct actual result, then the process checks the next (i.e. second, next highest confidence) suboptimal path, and so on, until a leaf node in a checked search path through the tree matches the result that was fed-back (at 510). Once this most optimal correct path in the model is identified, that is the path to which the patch becomes correlated, i.e. the environment and description information is incorporated as parameters into the nodes along that path.

The process of FIG. 5 returns to cognitive judgment (506) to continue assessing additional patches. Following the process, if the number, frequency, and/or rate of judgement failure is over a designed threshold, the entire model may be rebuilt using the collected feedback information to more accurately rebuild the model. Thus, when a new patch is encountered, ideally it can be added successfully into the present model and refine the tree nodes in that model. But, if there are too many wrong judgements, this can indicate that the number of "splits" (into success and failure branches) is too high. When the number of wrong judgements is above a desired threshold, which may be set and predefined by a user or administrator, this can trigger model automatic recreation the model.

Accordingly, some aspects can adjust/split the model based on feedback. If a user received a determination of "success" (meaning the output of the judgment engine is to recommend install of the patch based on following the path in the model), then the user may attempt to install the patch. If the actual installation result is failure, meaning the user attempted the install but the install failed for some reason, a new branch of the tree can be added because the identified leaf nodes indicated "success" but the actual result was a failure, which indicates the tree may need to be refined because it produced an incorrect assessment. The original 'success' branch (for instance as seen with Domain 3 of FIG. 4) can be split to include an added 'fail' branch as seen with Domain 3 of FIG. 4. In some examples, if received user feedback indicated a failure reason, this can be parsed to ascertain the most relevant layer(s)/levels to the root cause of the misjudgment.

Additionally or alternatively, with respect to some users for which the judgement engine presents a decision of 'failure', meaning the output of the judgment engine is to recommend not installing the patch, based on following the path in the model, then the system can decide a group of target 'uncertain' users to which the system nevertheless recommends installation of the patch despite it being expected to fail. The process checks the user feedback and if some actual threshold number/percentage of results are 'success', a new branch of the tree may be added and the original 'fail' branch may be split to include a new 'success' branch.

Figure 6:
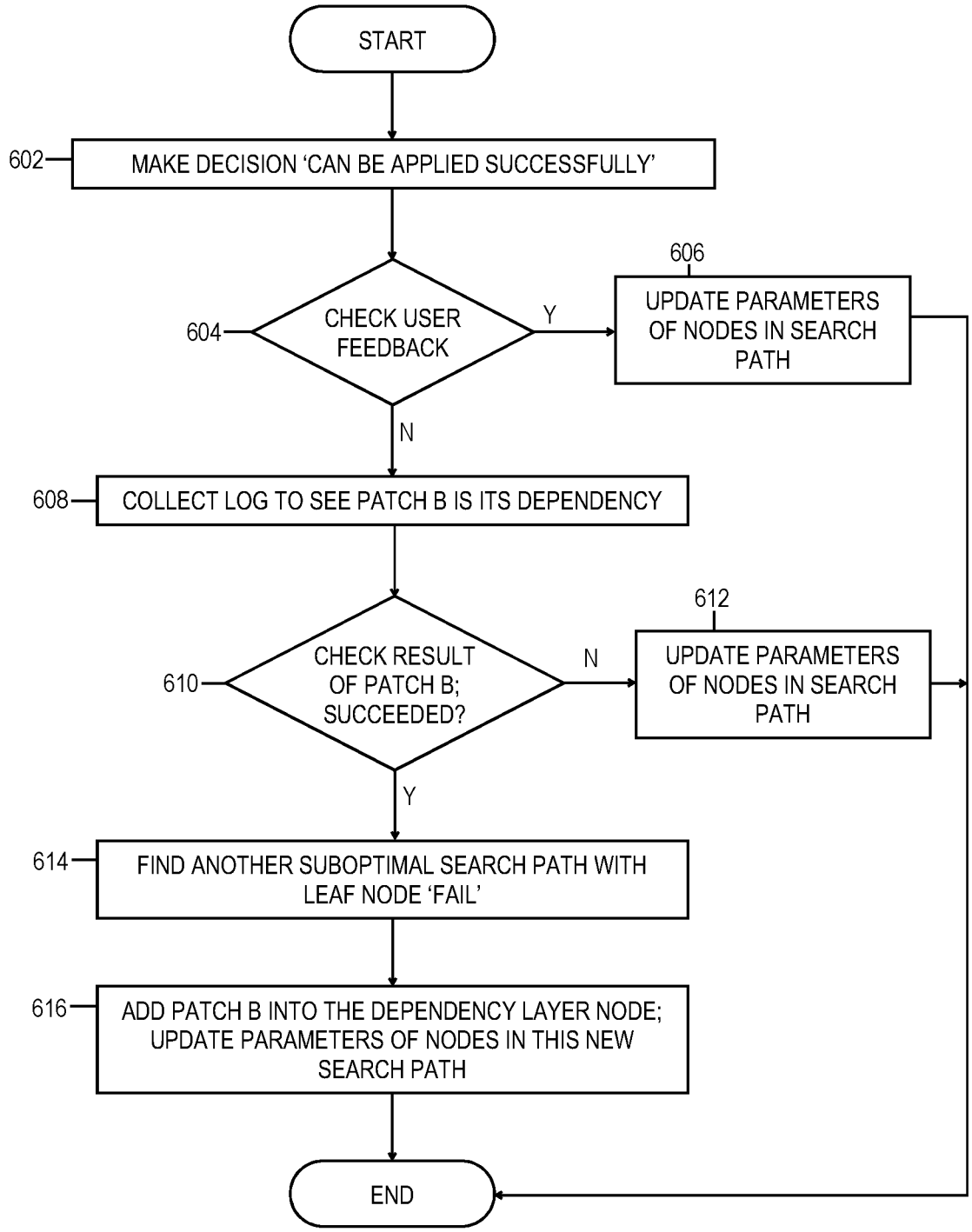
FIG. 6 depicts an example process for refining a hierarchical model, in accordance with aspects described herein.

FIG. 6 depicts an example process for refining a hierarchical model, in accordance with aspects described herein. This example illustrates cases where installation success of patch A may depend on installation of patch B as a dependency.

In some examples, the process of FIG. 6 is performed by the judgement engine. The process leverages the judgment engine, which uses model tree, to decide that patch A can be applied successfully (602). Based on that recommendation, a user attempts the install and provides feedback. The process checks that feedback (604) to obtain an indication about whether the install completed successfully. If installation is a success (604, Y), the process proceeds by updating the parameters of the nodes (in the model tree) in the search path, that is the path, of the tree, that was searched to arrive at the decision (602), to recommend install of the patch.

Otherwise, if the patch did not install successfully (604, N), the process collects and parses the install log and identifies that a dependency (patch B) was missing, and that caused the install failure of patch A (608). The process checks to see whether patch B installation succeeded (610). If not (610, N), then the process adds patch B into the dependency layer/level node and updates the parameters of the nodes in the search path, of the model, to which the patch A was correlated (612). Otherwise, (610, Y), the process finds the next suboptimal search path, of the model, whose leaf node indicated failure (the actual result of the installation attempt) (614), and then adds patch B into the dependency layer/level node and updates the parameters of the nodes in this newly identified suboptimal search path, of the model, to which the patch A is now to be correlated (616).

Figure 7:
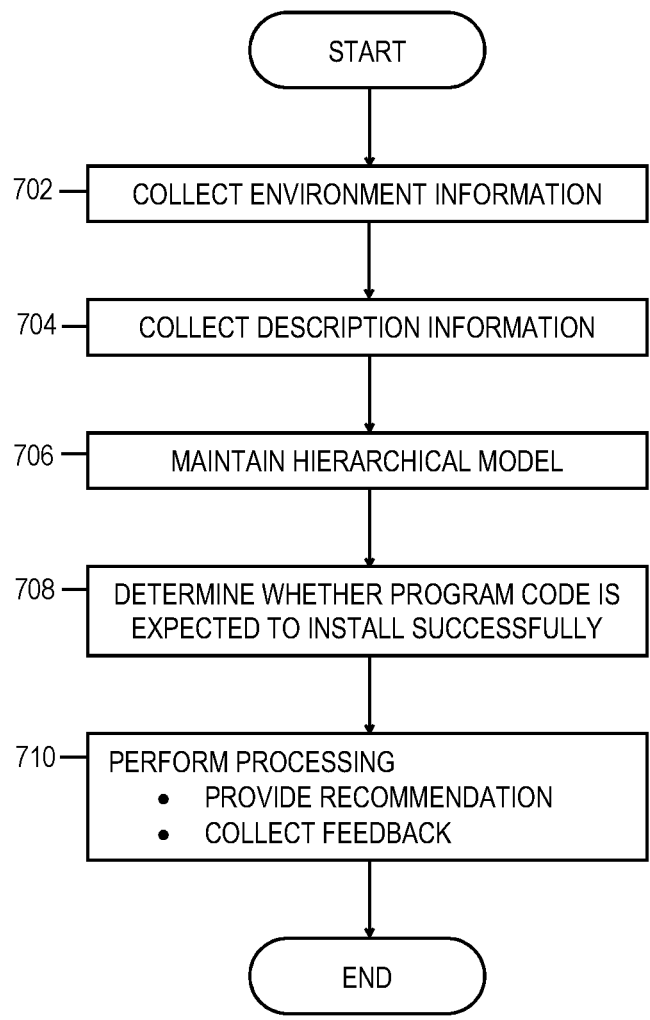
FIG. 7 depicts an example of automatically determining whether to install program code on a computer system, in accordance with aspects described herein.

FIG. 7 depicts an example of automatically determining whether to install program code on a computer system, in accordance with aspects described herein. In some examples, the process is performed by one or more computer systems, such as those described herein, which may include one or more computer systems of a cloud environment and/or in communication with cloud computing nodes, and/or one of more other computer systems.

The process begins by collecting environment information about a cloud computing environment (702). The environment information can include environment repository information, for instance identifiers of software installed on one or more computer systems of the cloud computing environment. The software can include virtual machines, operating systems, and software applications, middleware, and/or libraries. The environment information can further include installation history of software patches in the cloud computing environment and user acceptance levels of software installed on the computer systems.

The process proceeds by collecting description information (704) about program code for potential installation on a computer system of the cloud computing environment. The description information can be patch repository information. In some examples, the program code includes a software patch to one or more programs installed on the computer system.

The description information about the program code can include at least one selected from the group consisting of: (i) an ascertained software type to which the program code applies, (ii) an impact area selected from the group consisting of performance, function, and security, and (iii) one or more software dependencies of the program code. Collecting the description information can parse the description information from at least one selected from the group consisting of: a description of the program code from a remotely-hosted official release guide or based on a web-crawl, and a scan of a locally-maintained installation guide, copy of the program code, or identification of one or more software dependencies of the program code from a history of prior attempts to install the program code, as examples.

The process also includes maintaining a hierarchical model for determining whether the program code is expected to install properly on the computer system (706). The hierarchical model can include a hierarchy of multiple levels of program characteristics, such as levels of one or more of (i) a domain of software, (ii) an impact area or topic of software, (iii) one or more environmental factors of an installation environment, and (iv) software dependencies, as examples. In some embodiments, the initial level of the hierarchical model includes a domain of software, with the initial level referring to a level of nods that are direct children of the root node of the mode. Domain can be an ascertained software type selected from the group consisting of: an operating system type, a virtual machine type, or a network type, as examples.

The hierarchical model can include or be a tree data structure having leaf nodes, with each leaf node having a respective indication that the program code is expected to install correctly or that the program code is not expected to install correctly. In some examples, all subtrees under the root node of the tree data structure are constructed as binary tree data structures.

The process continues by, using the hierarchical model, determining whether the program code is expected to install properly (708). This determining can include performing an analysis that proceeds through one or more levels of the multiple levels of the hierarchical model based on the description information about the program code and arrives at an indication in the hierarchical model (for instance a leaf node thereof) as to whether the program code is expected to install properly. Procession through the one or more levels of the multiple levels of the hierarchical model based on the description information about the program code can include comparing a textual description of the program code (i.e. some of the patch description information) to representative other program code/programs that have been correlated to one or more domains indicated in the hierarchical model, one or more impact areas of the hierarchical model, and one or more environmental factors indicated in the hierarchical model, to correlate a domain, impact area, and at least one environmental factor of the program code (being assessed for installation) to the hierarchical model. This provides a way of determining where a proposed patch/program code fits, i.e. "correlates" into the model. A comparison is made between some patch description information and some description information of the representative programs/program code along different paths of the model hierarchy to find similarities and ascertain the domain, impact area, and environmental factors based on that comparison.

The process of FIG. 7 continues by performing processing based on determining whether the program code is expected to install properly (710). As part of this, the process generates and provides a recommendation to a user regarding installation of the program code, for example an indication of whether the program code is expected to install properly. In some examples, this indication, if indicating success is expected, can automatically trigger installation of the program code.

The maintaining the hierarchical model can include tracking success and failure of attempts to install each of multiple programs in the cloud computing environment, and correlating each of the multiple programs to respective paths in the hierarchical model, where the correlating correlates 'similar' programs to a common/same path of the hierarchical model based on identifying similarities between those programs. 'Correlating' in this context refers to the addition of relevant patch information to nodes along the path so that it identifies where patches with similar patch information fits into the model.

For a given path of the hierarchical model, an indication of whether a program that correlates to that path is expected to install properly can be based on a threshold installation success rate of the programs correlated to that path. If a threshold rate of programs correlated to that path are installed successfully, the path represents installation success indicating that programs that correlate to that path are expected to install properly. Conversely, if a threshold rate of programs correlated to that paths do not install successfully, the path represents installation failure indicating that programs that correlate to that path are not expected to install properly.

Feedback may be used to refine the model once built, and this refining may be encompassed in the maintenance of the hierarchical model. Based on attempted installation of the program code, the process can obtain an installation result indicating whether the program code actually installed properly, where the installation result contradicts the determined indication, from the model, of whether the program code is expected to install properly. In other words, the actual installation result is different than what the model predicted. Based on the installation result contradicting the determined indication of whether the program code is expected to install properly, the process can perform one selected from the group consisting of: (i) modifying the hierarchical model to replace a leaf node indicating whether the program code is expected to install properly with two mutually exclusive paths, one of the mutually exclusive paths indicating installation success and the other mutually exclusive path indicating installation failure, and each of the mutually exclusive paths indicating respective program code characteristics associated therewith (e.g. under Domain 3 in FIG. 4), and (ii) recorrelating the program code to a next optimal path, in the tree data structure, that reflects the installation result.

Although various examples are provided, variations are possible without departing from a spirit of the claimed aspects.

Figure 8:
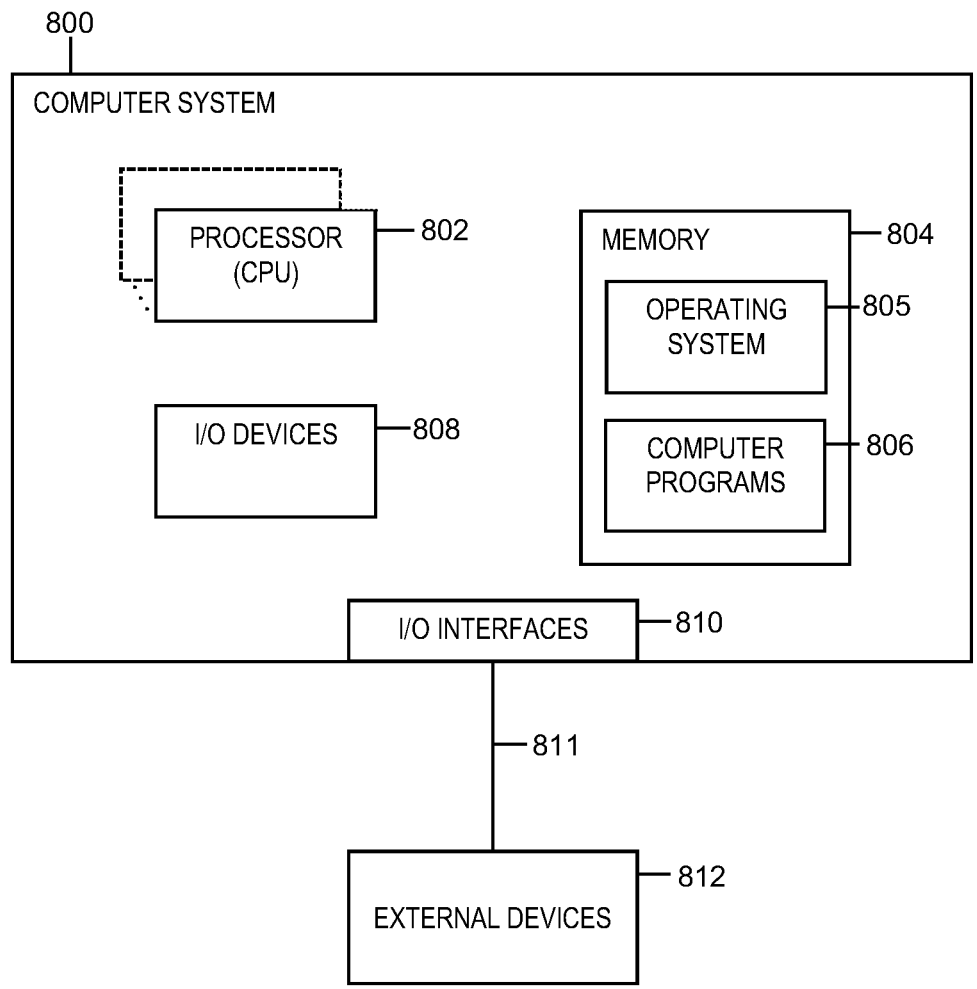
FIG. 8 depicts one example of a computer system and associated devices to incorporate and/or use aspects described herein.

Processes described herein may be performed singly or collectively by one or more computer systems, such as one or more computing systems of or in communication with a cloud computing environment, as examples. FIG. 8 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA) or Intel Corporation (Santa Clara, Calif., USA), as examples.

FIG. 8 shows a computer system 800 in communication with external device(s) 812. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include register(s) to be used by one or more of the functional components. Computer system 800 also includes memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive(s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (812) coupled to the computer system through one or more I/O interfaces 810.

Computer system 800 may communicate with one or more external devices 812 via one or more I/O interfaces 810. Example external devices include a keyboard, a pointing device, a display, and/or any other devices that enable a user to interact with computer system 800. Other example external devices include any device that enables computer system 800 to communicate with one or more other computing systems or peripheral devices such as a printer. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 may be any appropriate wireless and/or wired communication link(s) for communicating data.

Particular external device(s) 812 may include one or more data storage devices, which may store one or more programs, one or more computer readable program instructions, and/or data, etc. Computer system 800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 800 may be operational with numerous other general purpose or special purpose computing system environments or configurations. Computer system 800 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 9.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 9:
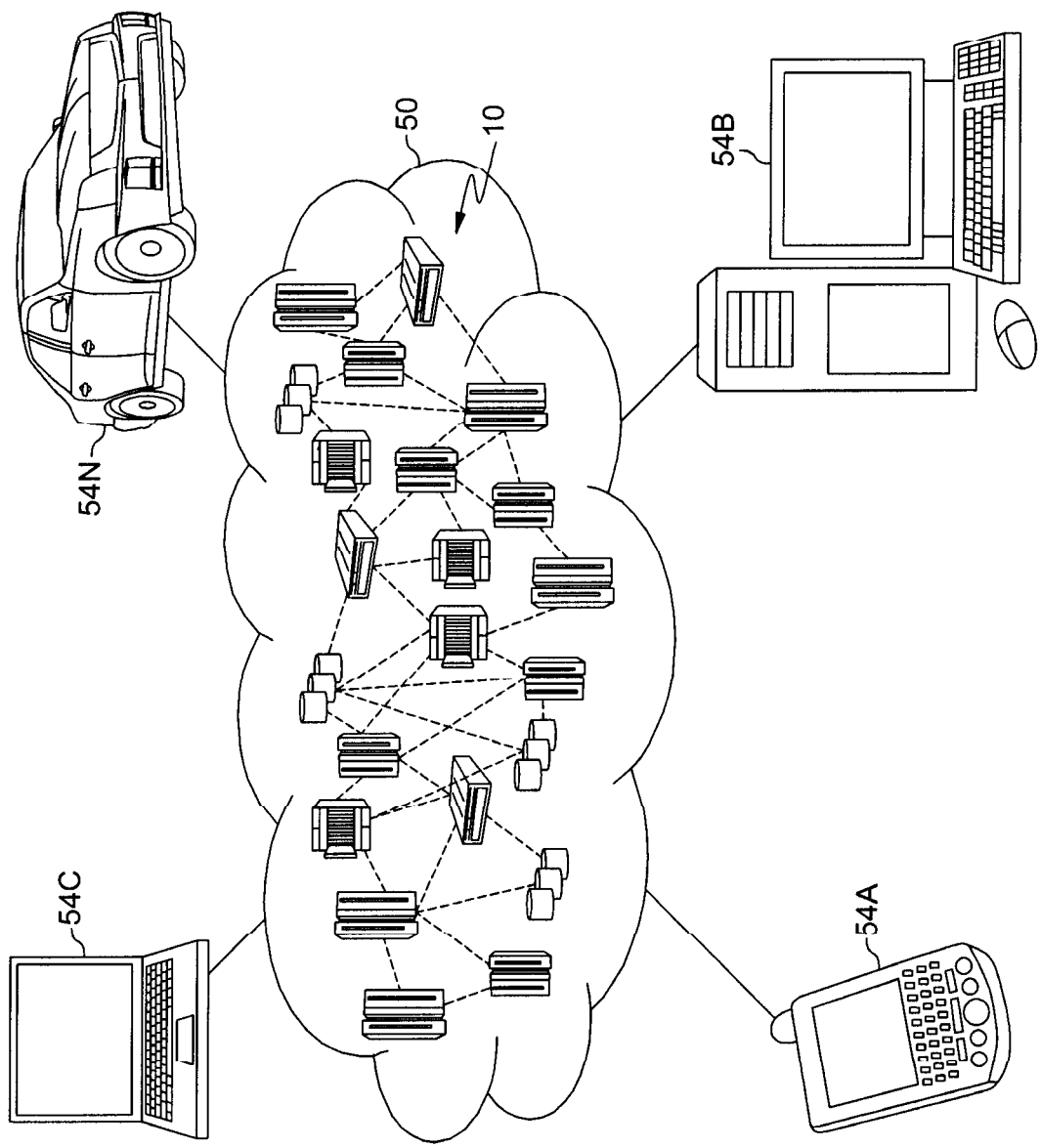
FIG. 9 depicts a cloud computing environment according to an embodiment of the present invention.

Referring now to FIG. 9, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
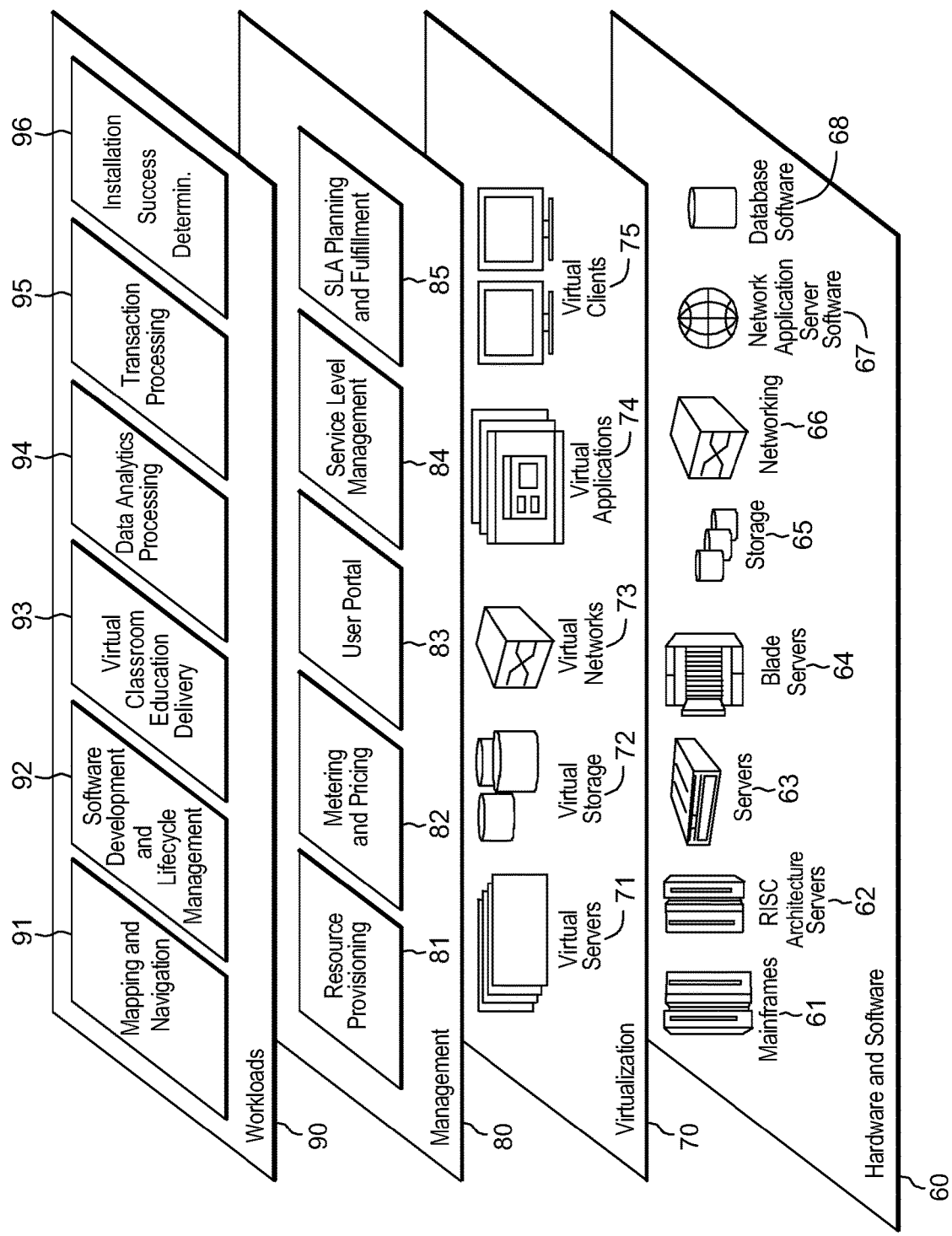
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and installation success determination 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    collecting environment information about a cloud computing environment, the environment information comprising identifiers of software installed on computer systems of the cloud computing environment;

collecting description information about program code for potential installation on a computer system of the cloud computing environment;

maintaining a hierarchical model for determining whether the program code is expected to install properly on the computer system, the hierarchical model comprising a hierarchy of multiple levels of program characteristics, wherein the hierarchical model comprises a tree data structure having leaf nodes, each leaf node having a respective indication that the program code is expected to install correctly or that the program code is not expected to install correctly;

using the hierarchical model in determining whether the program code is expected to install properly, the determining comprising performing an analysis that proceeds through one or more levels of the multiple levels of the hierarchical model based on the description information about the program code and arrives at an indication in the hierarchical model as to whether the program code is expected to install properly;

performing processing based on determining whether the program code is expected to install properly, wherein the performing processing comprises generating and providing a recommendation to a user regarding installation of the program code;

based on attempted installation of the program code, obtaining an installation result indicating whether the program code actually installed properly, wherein the installation results contradicts the determined indication of whether the program code is expected to install properly; and based on the installation result contradicting the determined indication of whether the program code is expected to install properly, performing one selected from the group consisting of:

modifying the hierarchical model to replace a leaf node indicating whether the program code is expected to install properly with two mutually exclusive paths, one of the mutually exclusive paths indicating installation success and the other mutually exclusive path indicating installation failure, and each of the mutually exclusive paths indicating respective program code characteristics associated therewith; and recorrelating the program code to a next optimal path, in the tree data structure, that reflects the installation result.

2. The method of claim 1, wherein the maintaining comprises:

tracking success and failure of attempts to install each of multiple programs in the cloud computing environment; and correlating each of the multiple programs to respective paths in the hierarchical model, wherein the correlating correlates programs to a common path of the hierarchical model based on identifying similarities between those programs.

3. The method of claim 2, wherein for a given path of the hierarchical model, an indication of whether a program that correlates to that path is expected to install properly is based on a threshold installation success rate of the programs correlated to that path, wherein based on a threshold rate of programs correlated to that path being installed successfully, the path represents installation success indicating that programs that correlate to that path are expected to install properly, and wherein based on a threshold rate of programs correlated to that path not installing successfully, the path represents installation failure indicating that programs that correlate to that path are not expected to install properly.

4. The method of claim 1, wherein the multiple levels of the hierarchical model comprise levels of at least one selected from the group consisting of: (i) a domain of software, (ii) an impact area or topic of software, (iii) one or more environmental factors of an installation environment, and (iv) software dependencies.

5. The method of claim 4, wherein an initial level of the hierarchical model comprises the domain of software, the domain being an ascertained software type, the software type being at least one selected from the group consisting of: an operating system type, a virtual machine type, and a network type.

6. The method of claim 4, wherein the procession through the one or more levels of the multiple levels of the hierarchical model based on the description information about the program code comprises comparing a textual description of the program code to representative programs correlated to one or more domains indicated in the hierarchical model, one or more impact areas of the hierarchical model, and one or more environmental factors indicated in the hierarchical model, to correlate a domain, impact area, and at least one environmental factor of the program code to the hierarchical model.

7. The method of claim 1, wherein subtrees under the root node of the tree data structure are binary tree data structures.

8. The method of claim 1, wherein the description information about the program code comprises at least one selected from the group consisting of: (i) an ascertained software type to which the program code applies, (ii) an impact area selected from the group consisting of performance, function, and security, and (iii) one or more software dependencies of the program code.

9. The method of claim 1, wherein the collecting the description information parses the description information from at least one selected from the group consisting of:

a description of the program code from a remotely-hosted official release guide or based on a web-crawl; and a scan of a locally-maintained installation guide, copy of the program code, or identification of one or more software dependencies of the program code from a history of prior attempts to install the program code.

10. The method of claim 1, wherein the software comprises virtual machines, operating systems, and software applications, and wherein the environment information further comprises installation history of software patches in the cloud computing environment and user acceptance levels of software installed on the computer systems.

11. The method of claim 1, wherein the program code comprises a software patch to one or more programs installed on the computer system.

12. A computer system comprising:

a memory; and a processor in communication with the memory, wherein the computer system is configured to perform a method comprising:

collecting environment information about a cloud computing environment, the environment information comprising identifiers of software installed on computer systems of the cloud computing environment;

collecting description information about program code for potential installation on another computer system of the cloud computing environment;

maintaining a hierarchical model for determining whether the program code is expected to install properly on the another computer system, the hierarchical model comprising a hierarchy of multiple levels of program characteristics, wherein the hierarchical model comprises a tree data structure having leaf nodes, each leaf node having a respective indication that the program code is expected to install correctly or that the program code is not expected to install correctly;

using the hierarchical model in determining whether the program code is expected to install properly, the determining comprising performing an analysis that proceeds through one or more levels of the multiple levels of the hierarchical model based on the description information about the program code and arrives at an indication in the hierarchical model as to whether the program code is expected to install properly;

performing processing based on determining whether the program code is expected to install properly, wherein the performing processing comprises generating and providing a recommendation to a user regarding installation of the program code;

based on attempted installation of the program code, obtaining an installation result indicating whether the program code actually installed properly, wherein the installation result contradicts the determined indication of whether the program code is expected to install properly; and based on the installation result contradicting the determined indication of whether the program code is expected to install properly, performing one selected from the group consisting of:

modifying the hierarchical model to replace a leaf node indicating whether the program code is expected to install properly with two mutually exclusive paths, one of the mutually exclusive paths indicating installation success and the other mutually exclusive path indicting installation failure, and each of the mutually exclusive paths indicating respective program code characteristics associated therewith; and recorrelating the program code to a next optimal path, in the tree data structure, that reflects the installation result.

13. The computer system of claim 12, wherein the maintaining comprises:

tracking success and failure of attempts to install each of multiple programs in the cloud computing environment; and correlating each of the multiple programs to respective paths in the hierarchical model, wherein the correlating correlates programs to a common path of the hierarchical model based on identifying similarities between those programs.

14. The computer system of claim 12, wherein the multiple levels of the hierarchical model comprise levels of at least one selected from the group consisting of:(i) a domain of software, (ii) an impact area or topic of software, (iii) one or more environmental factors of an installation environment, and (iv) software dependencies, and wherein the procession through the one or more levels of the multiple levels of the hierarchical model based on the description information about the program code comprises comparing a textual description of the program code to representative programs correlated to one or more domains indicated in the hierarchical model, one or more impact areas of the hierarchical model, and one or more environmental factors indicated in the hierarchical model, to correlate a domain, impact area, and at least one environmental factor of the program code to the hierarchical model.

15. A computer program product comprising:

a computer readable storage medium readable by a processor and storing instructions for execution by the processor for performing a method comprising:

collecting environment information about a cloud computing environment, the environment information comprising identifiers of software installed on computer systems of the cloud computing environment;

collecting description information about program code for potential installation on a computer system of the cloud computing environment;

maintaining a hierarchical model for determining whether the program code is expected to install properly on the computer system, the hierarchical model comprising a hierarchy of multiple levels of program characteristics, wherein the hierarchical model comprises a tree data structure having leaf nodes, each leaf node having an respective indication that the program code is expected to install correctly or the program code is not expected to install correctly;

using the hierarchical model in determining whether the program code is expected to install properly, the determining comprising performing an analysis that proceeds through one or more levels of the multiple levels of the hierarchical model based on the description information about the program code and arrives at an indication in the hierarchical model as to whether the program code is expected to install properly;

performing processing based on determining whether the program code is expected to install properly, wherein the performing processing comprises generating and providing a recommendation to a user regarding installation of the program code;

based on attempted installation of the program code, obtaining an installation result indicating whether the program code actually installed properly, wherein the installation result contradicts the determined indication of whether the program code is expected to install properly; and based on the installation result contradicting the determined indication of whether the program code is expected to install properly, performing one selected from the group consisting of:

modifying the hierarchical model to replace a leaf node indicating whether the program code is expected to install properly with two mutually exclusive paths, one of the mutually exclusive paths indicating installation success and the other mutually exclusive path indicating installation failure, and each of the mutually exclusive paths indicating respective program code characteristics associated therewith; and recorrelating then program code to a next optimal path, in the tree data structure, that reflects the installation results.

16. The computer program product of claim 15, wherein the multiple levels of the hierarchical model comprise levels of at least one selected from then group consisting of: (i) a domain of software, (ii) an impact area or topic of software, (iii) one or more environmental factors of an installation environment, and (iv) software dependencies, and wherein the procession through the one or more levels of the multiple levels of the hierarchical model based on the description information about the program code comprises comparing a textual description of the program code to representative programs correlated to one or more domains indicated in the hierarchical model, one or more impact areas of the hierarchical model, and one or more environmental factors indicated in the hierarchical model, to correlate a domain, impact area, and at least one environmental factor of the program code to the hierarchical model.

* * * * *